US006836621B1

(12) United States Patent
Bendelli

(10) Patent No.: US 6,836,621 B1
(45) Date of Patent: Dec. 28, 2004

(54) TUNABLE DEVICE FOR AND METHOD OF EXTRACTING AND INSERTING OPTICAL CARRIERS IN OPTICAL COMMUNICATIONS NETWORKS

(75) Inventor: Giampaolo Bendelli, Almese (IT)

(73) Assignee: Agilent Technologies, Inc., Palo Alto, CA (US)

( * ) Notice: Subject to any disclaimer, the term of this patent is extended or adjusted under 35 U.S.C. 154(b) by 500 days.

(21) Appl. No.: 09/685,572

(22) Filed: Oct. 11, 2000

(30) Foreign Application Priority Data

Oct. 11, 1999 (IT) .......................... TO99A0875

(51) Int. Cl.[7] .............................................. H04J 14/02
(52) U.S. Cl. ........................ 398/83; 398/82; 398/79; 398/84; 398/85; 398/87; 385/24; 385/37; 385/15; 385/16; 385/31
(58) Field of Search ...................... 398/82, 79, 83, 398/84, 85, 87; 385/24, 16, 31, 15, 37

(56) References Cited

U.S. PATENT DOCUMENTS

| | | | |
|---|---|---|---|
| 5,726,785 A | | 3/1998 | Chawki et al. |
| 5,793,908 A | * | 8/1998 | Mizuochi et al. ............. 385/24 |
| 5,812,709 A | | 9/1998 | Arai et al. |
| 5,953,467 A | * | 9/1999 | Madsen ........................ 385/15 |
| 5,999,292 A | * | 12/1999 | Dennis et al. ............... 398/101 |
| 6,212,315 B1 | * | 4/2001 | Doerr ........................... 385/31 |
| 6,487,331 B2 | * | 11/2002 | Hung ............................ 385/16 |
| 6,631,245 B1 | * | 10/2003 | Bendelli et al. .............. 398/83 |

FOREIGN PATENT DOCUMENTS

| | | |
|---|---|---|
| EP | 0638837 B1 | 9/1994 |
| EP | 0638837 A1 | 2/1995 |
| WO | 9809396 | 3/1998 |

OTHER PUBLICATIONS

Kim Se Yoon et al, "Channel–Switching Active Add/Drop Multiplexer with Tunable Gratings", Electronic Letter, IEEE Steveage, GB, vol. 34, No. 1, Jan. 8, 1998, pp. 104–105, XP006009124.

* cited by examiner

Primary Examiner—Hanh Phan

(57) ABSTRACT

A carrier is extracted from a stream of optical signals including plural wavelength division, multiplexed carriers modulated by corresponding signals while a carrier having the same wavelength as the extracted carrier is inserted into the stream. The stream of optical signals and the carrier to be inserted are coupled to a tunable wavelength selector having first wavelength and phase shift properties. Tuning of the wavelength selector is changed, so it has second wavelength and phase shift properties such that the entire stream of optical signals is coupled from an input port to an output port via the tunable wavelength selector, and the extracting and inserting operation is not performed while the tuning is changed. The other carriers are coupled from the input port to the output port via the selector while extracting and inserting are performed, and the selector has the first wavelength and phase shift.

20 Claims, 2 Drawing Sheets

TUNABLE DEVICE FOR AND METHOD OF EXTRACTING AND INSERTING OPTICAL CARRIERS IN OPTICAL COMMUNICATIONS NETWORKS

RELATED APPLICATIONS

The present application is based on, and claims priority from, Italy Application No. TO99 A 00875, filed Oct. 11, 1999, the entire disclosure of which is hereby incorporated by reference herein.

FIELD OF THE INVENTION

Background of the Invention

The present invention relates to optical communications networks, and more particularly to a device for extracting, from a stream of optical signals comprising a plurality of carriers, one or more carriers, modulated by corresponding data signals, and inserting into the stream one or more other carriers, also modulated by corresponding data signals, normally different from the preceding ones.

These devices are commonly known in the art by the abbreviation OADM (Optical Add-Drop Multiplexer). The devices form a key element for the construction of nodes with wavelength-based routing functions in wavelength division multiplexing communications networks: in this case, they are used to extract from the multiplexed stream one or more channels containing the data intended for a user or users connected to the node, while allowing the remaining channels to pass unaltered, and to add to the multiplexed stream one or more channels which carry the data generated within the node. In practice, in order to optimize the use of the optical band, it is convenient to allocate the extracted and the added channel (or each pair consisting of an extracted and an added channel) to the same wavelength location.

SUMMARY OF THE INVENTION

One of the characteristics required in a device of this type for the new generation of optical networks is reconfigurability, in other words the possibility of selecting the channel or channels to be extracted and inserted by means of a remote command.

A system commonly used for making tunable extraction and insertion devices makes use of an element sensitive to the wavelength of the channel to be extracted and inserted, connected between a pair of circulators, one of which receives the multiplexed stream.

In one example, described in European Patent EP-B 0 638 837 in the name of the present applicant, the wavelength-sensitive element is a tunable optical bandpass filter of the Fabry-Perot resonant cavity type, formed in the fibre, which transmits the wavelength to which it is tuned and reflects all others. With this arrangement, one of the circulators forms the input/output ports for the multiplexed stream, while the other forms the carrier extraction and insertion ports. The tuning is carried out by varying the length of the cavity, e.g. by means of a voltage command.

In more recent versions of the same system, the wavelength-sensitive element is a Bragg grating in the optical waveguide, which reflects the resonance wavelength and transmits all others, so that the channel to be extracted is reflected from the grating towards the circulator which has received the multiplexed stream, and passes out of it, while the channels in transit proceed towards the second circulator, through which is inserted the new channel which, by reflection in the grating, will pass out of the second circulator together with the channels in transit. A structure of this type is described, for example, in the paper "Add-Drop Ottici per reti WDM", presented by G. Bendelli et al. at the "Fotonica 97" conference, Rome, Italy, 20–23 May 1997, and published on pp. 18ff. of the conference proceedings. A grating can easily be tuned by thermal means or by application of mechanical stresses.

A limitation present in the aforementioned structures is that, during the tuning transient, the spectrum of the wavelength-sensitive element can pass through spectral regions to which channels used in the network are allocated. Since these known structures do not provide means for disabling the extraction function, the tuning transient can cause the suppression, for a certain time interval, of the intermediate channels between the "old" and "new" tuning channel. In general, this degradation of the channels in transit, although temporary, is unacceptable, and limits the useful tuning range to the space between channels, enabling the spectrum of the wavelength-sensitive element to be moved only between adjacent channels. The limitation is becoming serious, since the development of optical components makes it possible to obtain both an increasing channel density and increasingly broad ranges of tunability.

The object of the invention is therefore to provide a device with improved properties of reconfigurability, and in particular a device which eliminates the limitation of the tuning range arising from the constraint of not interfering with the channels in transit during the transient.

The device according to the invention comprises:

input-output means which form an input port for the multiplexed stream to be subjected to the extraction and insertion operations, an output port for the multiplexed stream resulting from the said operations, and extraction and insertion ports for the carrier or carriers concerned, and wavelength-sensitive means for the selection of the carrier or carriers within the stream, the said selection being tunable according to an external command, and is characterized in that the selection means are inserted into an element which is sensitive to the phase of the signals of the said stream and/or of the said carrier or the said carriers and is associated with phase control means which are capable of introducing into the said signals a) for a given tuning condition of the selection means, a first phase shift value, such that the selected carrier or carriers to be extracted can pass from the input port to the extraction port and the selected carrier or carriers to be inserted can pass from the insertion port to the output port, and the other carriers can pass from the input port to the output port;

b) during a change of the tuning of the selection means, a second phase shift value such that all the carriers are caused to be transferred from the input port to the output port, thus disabling the extraction operation.

In a first embodiment of the invention, the wavelength-sensitive element is inserted in a Sagnac interferometer and the phase control means, during a change of tuning, are capable of establishing the same interference conditions for all the carriers in the stream.

In a second embodiment, the wavelength-sensitive element consists of a pair of tunable Bragg gratings and the phase control means interact with the said gratings in such a way that the latter, being tuned to a single wavelength not belonging to any carrier in the stream, act as a Fabry-Perot cavity transparent to the resonance wavelength.

BRIEF DESCRIPTION OF THE DRAWINGS

For further clarification, reference will be made to the attached drawings, in which.

DETAILED DESCRIPTION OF THE INVENTION

In the following description, which refers by way of example to devices which use tunable in-fibre Bragg gratings as the wavelength-sensitive elements. The basic layout is that of the tunable devices described above, in each of which there is a wavelength-sensitive element inserted between two circulators 1, 3. The means for wavelength tuning, not shown, must be such that the resonance wavelength can be varied from a control centre of the node or of the network, as shown schematically by the broken line arrow 4.

Figure 1:
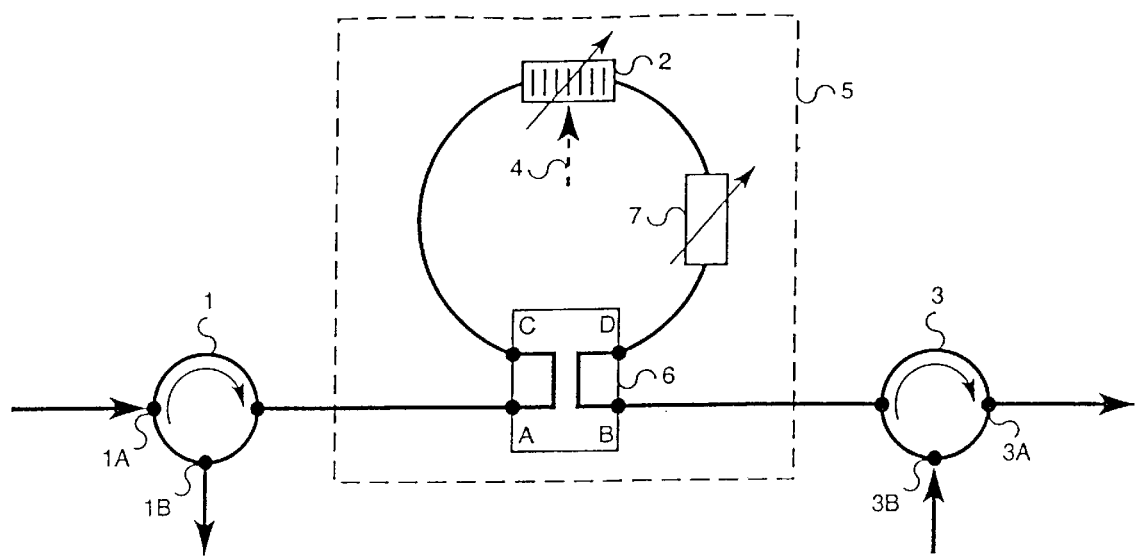
FIG. 1 is a diagram of a first embodiment of the device which is the object of the invention.

In the embodiment illustrated in FIG. 1, the tunable Bragg grating 2 is inserted in a Sagnac interferometer structure, indicated as a whole by 5, whose coupler 6 (3 dB coupler) is connected to the circulators 1, 3. A phase control element 7, capable of introducing a controllable phase shift into the stream passing through it, is also placed within the interferometer 5.

Given the operating principles of a Sagnac interferometer, it is evident that the multiplexed stream enters through the port 1A of the circulator 1 and leaves this circulator through the port 1B, while the tuning channel can be extracted and inserted through the ports 3A and 3B respectively of the circulator 3.

Figure 2:
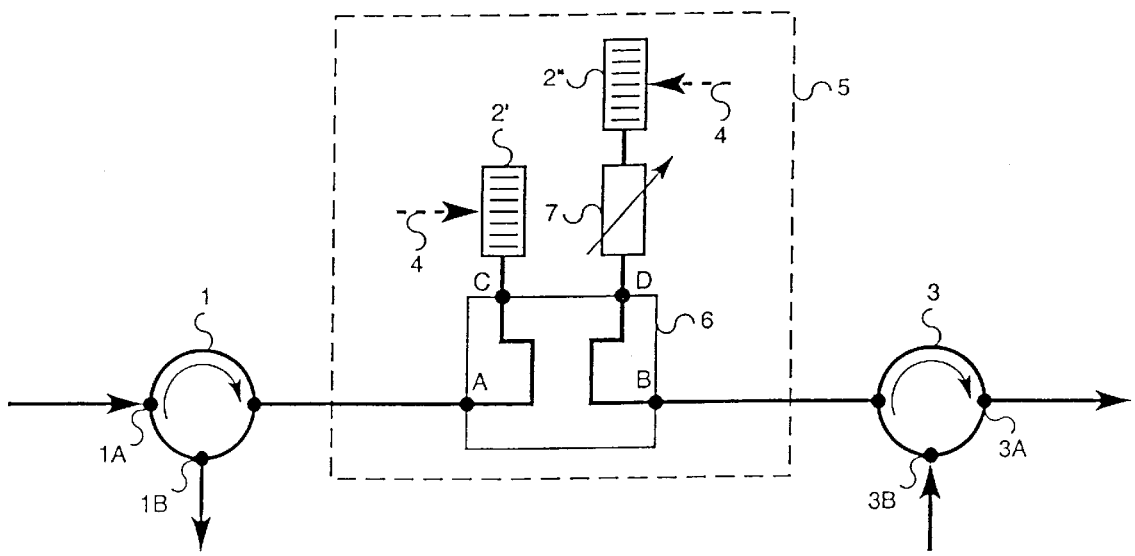
FIG. 2 is a diagram illustrating the operation of the device of FIG. 1.

In particular, in normal operating conditions, the loop 5 always returns all the wavelengths except the grating resonance wavelength towards the circulator 1: this is because, if A and B denote the ports of the coupler 6 connected to the circulators 1, 3, then regardless of the phase shift introduced by the element 7 there will be destructive interference at the exit from the port B, while there will be constructive interference at the exit from the port A. For the resonance wavelength $\lambda_i$ of the grating 2, the loop 5 is actually open and the structure of the device is equivalent to that of FIG. 2. The coupler 6 still has its ports A, B connected to the circulators 1, 3, but the two ports C, D act as if they were connected to two separate gratings 2', 2", with the element 7 connected in series between one of these ports and the corresponding grating (port D, grating 2" in the drawing). To obtain constructive or destructive interference at the ports A, B, an appropriate phase shift must be introduced by means of the device 7. In particular, in order to obtain the desired channel extraction and insertion function, a phase shift is introduced such that there is constructive interference at the exit from the port B for the channel at the wavelength $\lambda_i$ arriving from the circulator 1 and therefore, by symmetry, constructive interference at the exit from the port A for the channel at the wavelength $\lambda_i$ arriving from the circulator 3. In other words, there is constructive interference in transmission through the device, and destructive interference in reflection.

The presence of the phase control element 7 overcomes the drawbacks of the known devices. This is because, when it is necessary to change the tuning of the device, it is sufficient to change the phase shift introduced by the element 7 by $\pi/2$ before the Bragg grating 2 is tuned in such a way as to allocate the spectral response to the new channel to be extracted or inserted. As a result, constructive interference is also obtained in reflection for the channel at the tuning wavelength of the grating 2, and therefore, during the transient, any intermediate channels which temporarily resonate with the grating will still be routed towards the port 1A. The stream therefore undergoes no degradation. At the end of the tuning transient, the phase shift introduced by the phase section is returned to the initial value so that the new resonant channel can be rerouted as was done originally.

Clearly, the behaviour of the device will be complementary if the wavelength-sensitive element which is used is a component which transmits the selected wavelength instead of reflecting it.

Figure 3:
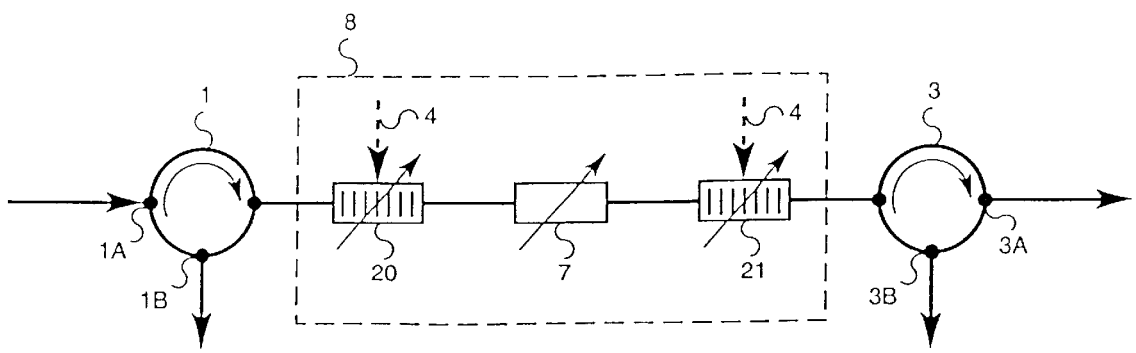
FIG. 3 is a diagram of a second embodiment of the device which is the object of the invention.
Figure 4A:
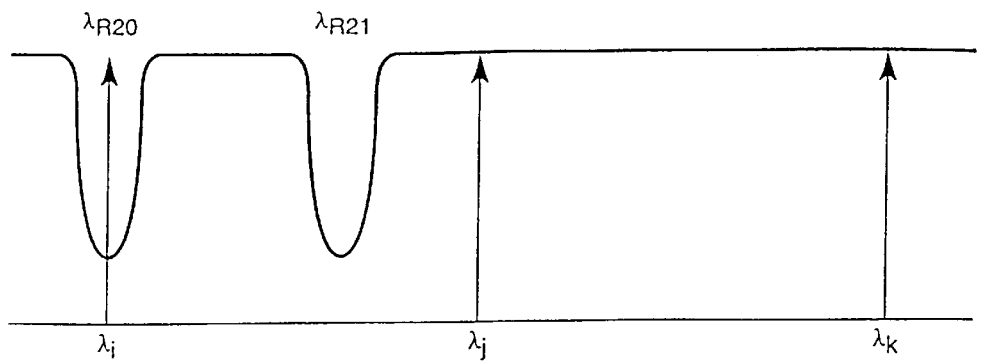
FIGS. 4A–4D are graphs illustrating the operation of the device of FIG. 3.

In FIG. 3, the phase control element 7 is inserted between a pair of tunable Bragg gratings 20, 21. In normal operating conditions, as shown in FIG. 4A, one of the gratings, e.g. the grating 20, has a resonance wavelength (indicated by $\lambda_{R20}$) coincident with the wavelength $\lambda_i$ of a carrier to be extracted or inserted, while the second grating has a resonance wavelength $\lambda_{R21}$ not coincident with any channel of the multiple. In these conditions, the grating 21 is transparent to all the wavelengths of the multiple and the phase control element 7 has no effect. The device then acts as a conventional device with a single grating, and one of the circulators, e.g. the circulator 1, is used for receiving the multiplexed stream and extracting the desired carrier, while the circulator 3 receives the carrier to be inserted and sends the recombined multiplexed stream from its output.

Figure 4B:
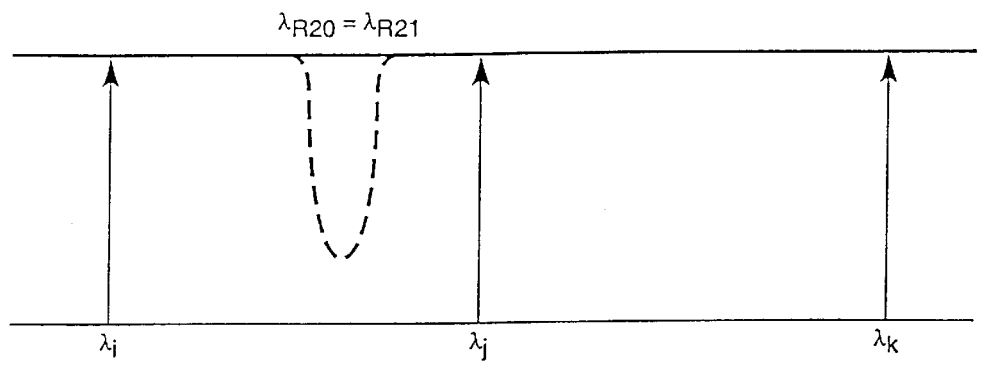

At the moment at which the tuning is changed to proceed to the extraction and insertion of the carrier at the wavelength $\lambda_k$, not adjacent to the preceding carrier at the wavelength $\lambda_i$, the presence of the two gratings 20, 21 can be exploited to form a Fabry-Perot resonant cavity, indicated as a whole by 8, which is transparent to the resonance wavelength. This requires the adjustment of the phase control element 7 in such a way as to introduce a phase shift such that the total transmission condition is obtained for the cavity 8, and requires that, during the transient, the gratings 20, 21 be now brought into resonance at the same wavelength, which is, for example, intermediate between the two adjacent channels associated with the carriers at the wavelengths $\lambda_i$, $\lambda_j$ (FIG. 4B). After this has been done, the tunings of the gratings 20, 21 (FIG. 4C) are changed jointly, in a second step, until the spectrum of the grating 20 which actually selects the wavelength of the channel to be extracted or inserted has been moved to the new channel at the wavelength $\lambda_k$ (FIG. 4D); finally, the resonance wavelength of the grating 21 is returned to a value which does not coincide with that of any channel.

Figure 4C:
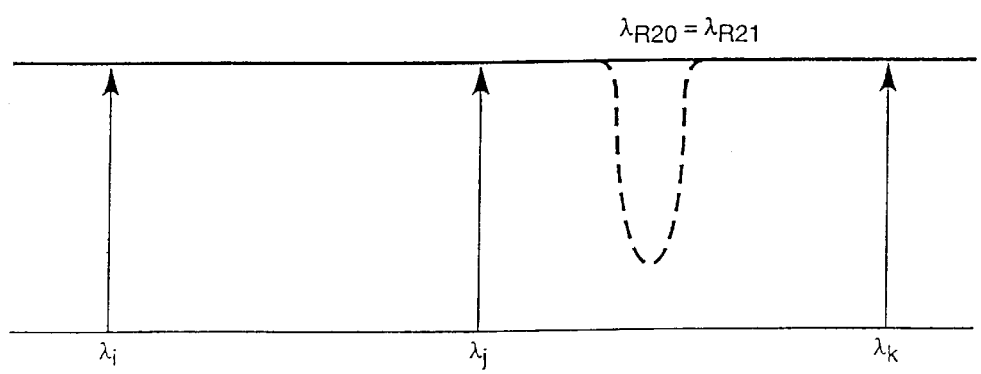
Figure 4D:
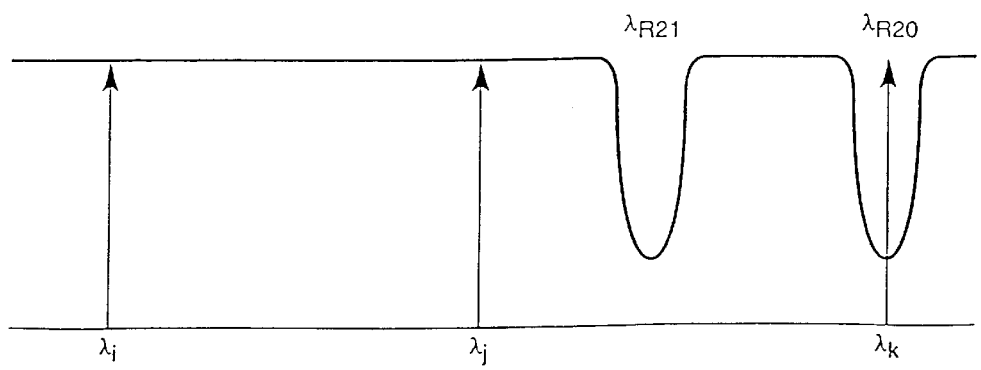

It should be noted that, for the sake of clarity, the band reflected by the gratings 20, 21 is again indicated in broken lines in FIGS. 4B, 4C, even though, as stated above, the Fabry-Perot cavity 8 has been brought into total transmission conditions.

It should also be noted that, in this case, the element 7 can be a static phase shift device of appropriate value, although the possibility of remote control can be used to achieve an optimization of the device on line and for wide tuning ranges.

The proposed structure, and particularly that based on the Sagnac interferometer, can be implemented by means of various technologies, but is particularly suitable for implementation by means of planar optics technologies since these can be used to produce interferometric optical structures which are stable over time. On the other hand, polymer materials with a high coefficient of thermal tuning are becoming available, and these, owing to the wide thermal tuning range, are well suited to the achievement of the objects of the invention in wavelength division multiplexing communications systems with closely spaced channels.

Clearly, the above description is provided solely by way of example and without restrictive intent, and variations and modifications may be produced without departure from the scope of protection of the invention. In particular, the various components described can be replaced by others having equivalent behaviour.

What is claimed is:

1. A tunable device for extracting at least one carrier from a stream of optical signals including a plurality of wavelength division multiplexed carriers modulated by corresponding data signals and for inserting into the stream at least one other carrier at the same wavelength as the extracted at least one carrier, the device comprising:

an input port for the multiplexed stream to be subjected to the extraction and insertion operations, an output port for the multiplexed stream resulting from the operations, extraction and insertion ports respectively for the at least one carrier to be extracted and the at least one carrier to be inserted, and a tunable wavelength-sensitive selector for selecting the at least one carrier to be extracted and the at least one carrier to be inserted, the selector being tunable according to an external command, the selector being included in an element which is sensitive to the phase of at least one of (a) the optical signals of said stream, (b) the at least one carrier to be extracted and (c) the at least one carrier to be inserted; the selector being associated with a phase controller for introducing into said optical signals:

(a) a first phase shift value for a given tuning condition of the selector, the first phase shift value being such that the selected at least one carrier to be extracted can pass from the input port to the extraction port and the selected at least one carrier to be inserted can pass from the insertion port to the output port, and the other carriers can pass from the input port to the output port;

(b) a second phase shift value during a change of the tuning of the selector, the second phase shift value being such that all of the wavelength division multiplexed carriers in the stream of optical signals are caused to be transferred from the input port to the output port for thereby disabling the extraction operation.

2. The device according to claim 1 wherein the said phase-sensitive element is a Sagnac interferometer.

3. The device according to claim 1 wherein the phase controller is capable of introducing a phase shift in which said first value is such as to cause a constructive interference in transmission (reflection) for the selected at least one carrier to be extracted, and in reflection (transmission) for the at least one carrier inserted and for those to which the extraction and insertion operation does not relate, and said second value is such as to cause constructive interference at the same output for all the carriers.

4. The device according to claim 1 wherein the phase-sensitive element is a Fabry-Perot resonant cavity including a pair of tunable Bragg gratings which form the wavelength-sensitive selector, and the phase controller being interposed between the two gratings.

5. The device according to claim 4 wherein for the said given tuning condition, a first of the gratings is tuned to be resonate at a wavelength corresponding to that of the carriers to be extracted and inserted, and the other grating is tuned to be resonate at a wavelength different from that of all the carriers of the stream, and in that, during the change of tuning, both gratings are capable of resonating at a single wavelength, different from that of any of the carriers of the stream, and the phase controller is capable of introducing, as the second phase shift value, the phase shift which makes the Fabry-Perot resonant cavity transparent to the resonance wavelength of the two gratings.

6. A method of selectively performing an operation of (a) extracting at least one carrier from a stream of optical signals including plural wavelength division multiplexed carriers modulated by corresponding data signals while (b) inserting into the stream at least one carrier having the same wavelength as the extracted at least one carrier, the method comprising performing the operation by coupling the stream of optical signals and the at least one carrier to be inserted to a tunable wavelength selector set to have first wavelength and phase shift properties; changing the tuning of the tunable wavelength selector, setting the selector so it has second wavelength and phase shift properties to achieve the tuning, the second wavelength and phase shift properties being such that (a) the entire stream of optical signals is coupled from an input port to an output port via the tunable wavelength selector and (b) the extracting and inserting operation is not performed while the tuning is changed.

7. The method of claim 6 wherein the stream includes other carriers that are not to be extracted, and coupling the other carriers from the input port to the output port via the selector while the extracting and inserting operation is being performed and the selector is set to have the first wavelength and phase shift properties.

8. The method of claim 7 wherein the extracting and inserting operation is performed by supplying the stream to a first port of a first circulator on a first side of the selector while supplying the at least one carrier to be inserted to a first port of a second circulator on a second opposite side of the selector while the selector supplies (a) the extracted carrier to a second port of the first circulator and the first circulator supplies the extracted carrier to a third port thereof and (b) the other carriers to a second port of the second circulator while the at least one carrier to be inserted is supplied to the second port of the second circulator and the at least one carrier is coupled to a third port of the second circulator, the first port of the first circulator and the third port of the second circulator being the input and output, respectively.

9. The method of claim 7 wherein the extracting and inserting operation is performed by supplying the stream to a first port of a first circulator on an upstream side of the selector while supplying the at least one carrier to be inserted to a first port of a second circulator on a downstream side of the selector while the first circulator supplies the extracted carrier to an output port of the first circulator and while an input port of the second circulator is responsive to the at least one carrier to be inserted.

10. The method of claim 7 wherein:
the first wavelength and phase shift properties cause the wavelength selector to be at (a) the wavelength of the at least one carrier to be inserted and the at least one carrier to be extracted and (b) a wavelength different from the other carriers, and the second wavelength and phase shift properties cause the wavelength selector to be at a wavelength different from all carriers in the stream of optical signals and the at least one carrier that is selectively inserted.

11. The method of claim 6 wherein the second wavelength and phase shift properties are achieved while the tuning is being changed and the extracting and the extracting and inserting operation is not performed while the timing is being changed.

12. The method of claim 11 wherein the second phase shift property results from a second phase shift being introduced during the changing of the tuning.

13. The method of claim 6 wherein the second phase shift property results from a second phase shift being introduced during the changing of the tuning.

14. Apparatus for selectively performing an operation of (a) extracting at least one carrier from a stream of optical signals including plural wavelength division multiplexed carriers modulated by corresponding data signals while (b) inserting into the stream at least one carrier having the same wavelength as the extracted at least one carrier, the apparatus comprising a tunable wavelength selector, optical circuitry adapted to be responsive to the stream of optical signals and the at least one carrier to be inserted and coupled with the tunable wavelength selector for deriving the extracted at least one carrier at a first output adapted to be responsive to the selector, and a further output for selectively including the at least one carrier inserted into the stream, the tunable wavelength selector being settable to have first wavelength and phase shift properties and being coupled with the optical circuitry so an output port of the optical circuitry is arranged to to have coupled to it by the wavelength selector the at least one carrier to be inserted; the tunable wavelength selector being settable to have second wavelength and phase shift properties while tuning of the tunable wavelength selector is occurring, the second wavelength and phase shift properties and the optical circuitry being arranged such that during tuning of the tunable wavelength selector, the entire stream of optical signals is coupled to the output port via the tunable wavelength selector and during detuning of the tunable wavelength selector the carrier to be inserted in the stream of optical signals is prevented from being coupled to the output port.

15. The apparatus of claim 14 wherein the stream includes other carriers that are not to be extracted, the wavelength selector and the optical circuitry being arranged so that the other carriers are coupled to the output port via the wavelength selector while the carrier to be inserted is coupled to the output port and the selector is set to have the first wavelength and phase shift properties.

16. The apparatus of claim 14 wherein the optical circuitry and the tunable wavelength selector are such that the first wavelength and phase shift properties cause the wavelength selector to be at (a) the wavelength of the at least one carrier to be inserted and the at least one carrier to be extracted and (b) a wavelength different from the other carriers, and the second wavelength and phase shift properties cause the wavelength selector to be at a wavelength different from all carriers in the stream of optical signals and the at least one carrier that is selectively inserted.

17. The apparatus of claim 16 wherein the second phase shift property results from a second phase shift being introduced during the changing of the tuning.

18. The apparatus of claim 14 wherein the second phase shift property results from a second phase shift being introduced during the changing of the tuning.

19. The apparatus of claim 14 wherein the second wavelength and phase shift properties are achieved while the tuning is being changed and the extracting and the extracting and inserting operation is not performed while the timing is being changed.

20. The apparatus of claim 19 wherein the second phase shift property results from a second phase shift being introduced during the changing of the tuning.

* * * * *